United States Patent [19]
Reihl et al.

[11] Patent Number: 5,897,160
[45] Date of Patent: Apr. 27, 1999

[54] MOTOR VEHICLE ROOF WITH A SERIES OF RAISABLE COVER ELEMENTS

[75] Inventors: Peter Reihl, Starnberg; Manfred Färber, Weilenbach; Robert Kronseder, Hohenpolding, all of Germany

[73] Assignee: Webasto Karosseriesysteme GmbH, Stockdorf, Germany

[21] Appl. No.: 08/812,663

[22] Filed: Mar. 7, 1997

[30] Foreign Application Priority Data

Mar. 7, 1996 [DE] Germany .............................. 196 08 916

[51] Int. Cl.[6] ........................................................ B60J 7/00
[52] U.S. Cl. ...................................... 296/220.01; 296/224
[58] Field of Search ............................ 296/216.01–216.03, 296/220.01, 223, 224

[56] References Cited

U.S. PATENT DOCUMENTS 5,335,961   8/1994  Reinsch et al. ................. 296/220.01
5,362,122  11/1994  Reihl et al. ....................... 296/216.03
5,484,185   1/1996  Salz et al. ........................... 296/223 X

*Primary Examiner*—Dennis H. Pedder
*Attorney, Agent, or Firm*—Sixbey, Friedman, Leedom & Ferguson; David S. Safran

[57] ABSTRACT

The invention relates to a motor vehicle roof with cover elements which are joined on each of their narrow sides to a pivotable attachment element which is guided along a guideway attached to the roof. Adjacent attachment elements are coupled for joint movement in the opening and closing direction so long as neither is in a fully swung-out position, and are decoupled, one by one as each of the adjacent attachment elements reaches its fully swung-out position. In the decoupled state, the adjacent attachment elements can be moved against one another as they are fully swung-out. An attachment element in the fully swung-out position is locked securely on the roof under the influence of the opening motion of an adjacent attachment element by a respective pivotable locking element, and is automatically released under the influence of the closing motion of the other adjacent attachment elements.

25 Claims, 6 Drawing Sheets

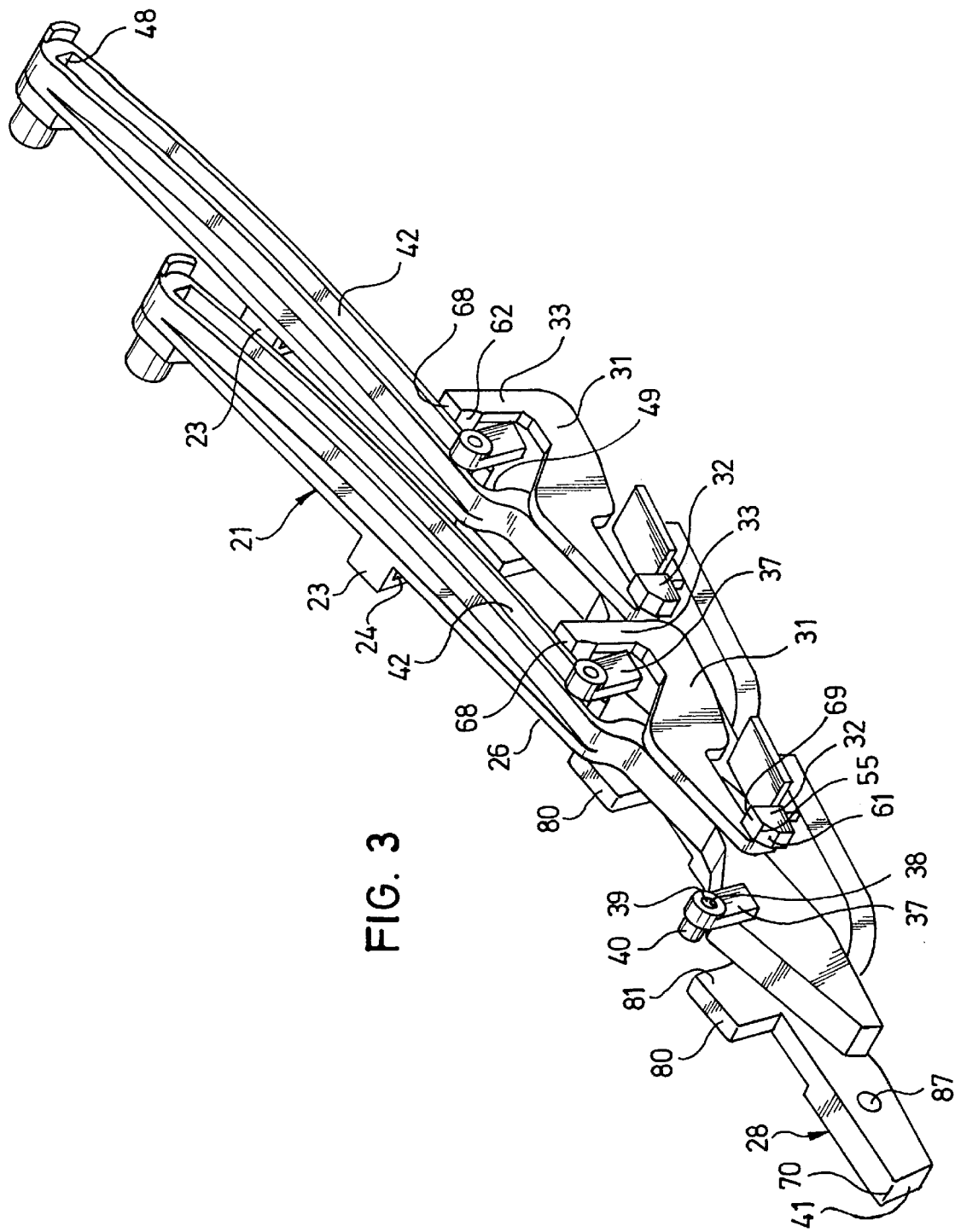

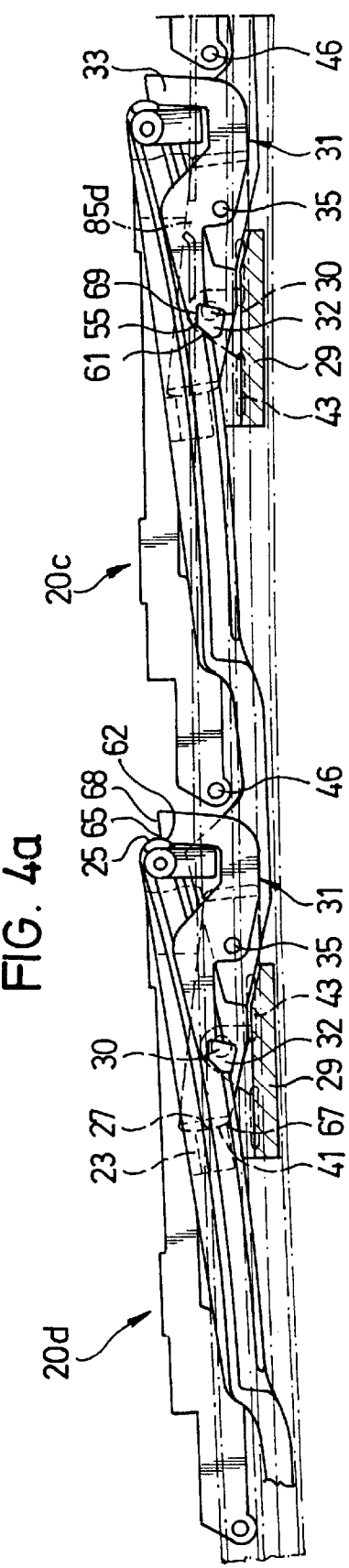
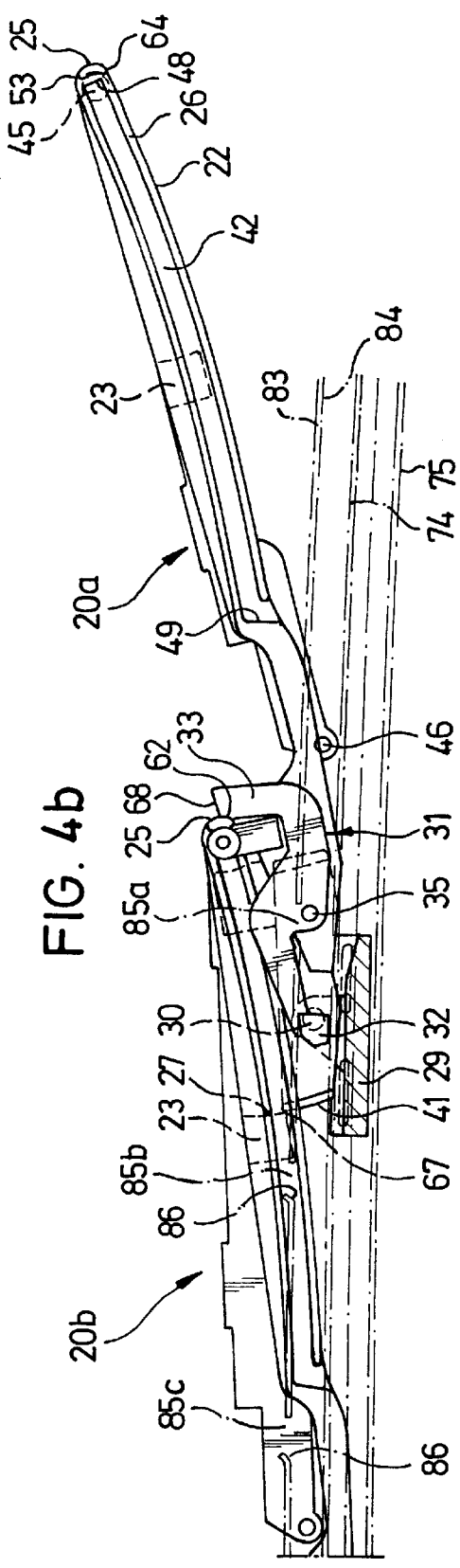
FIG. 4a
FIG. 4b

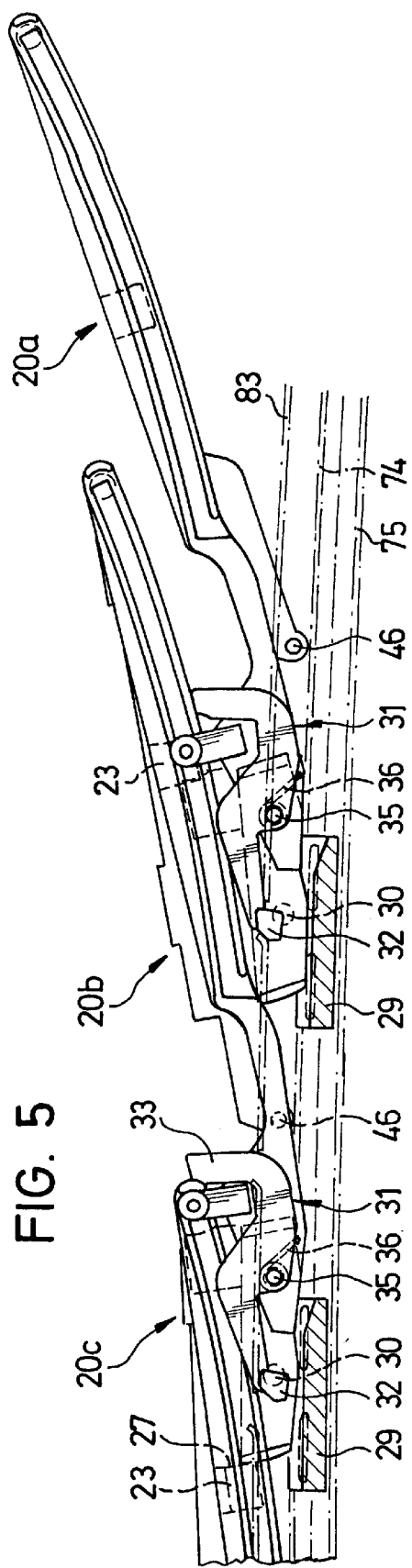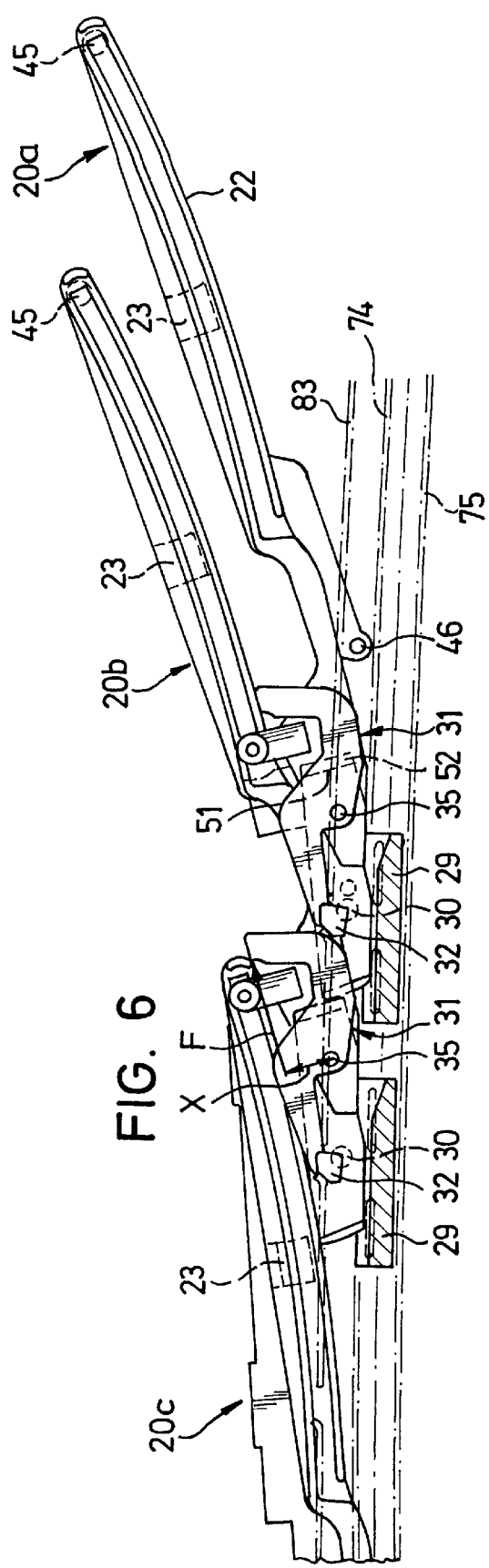

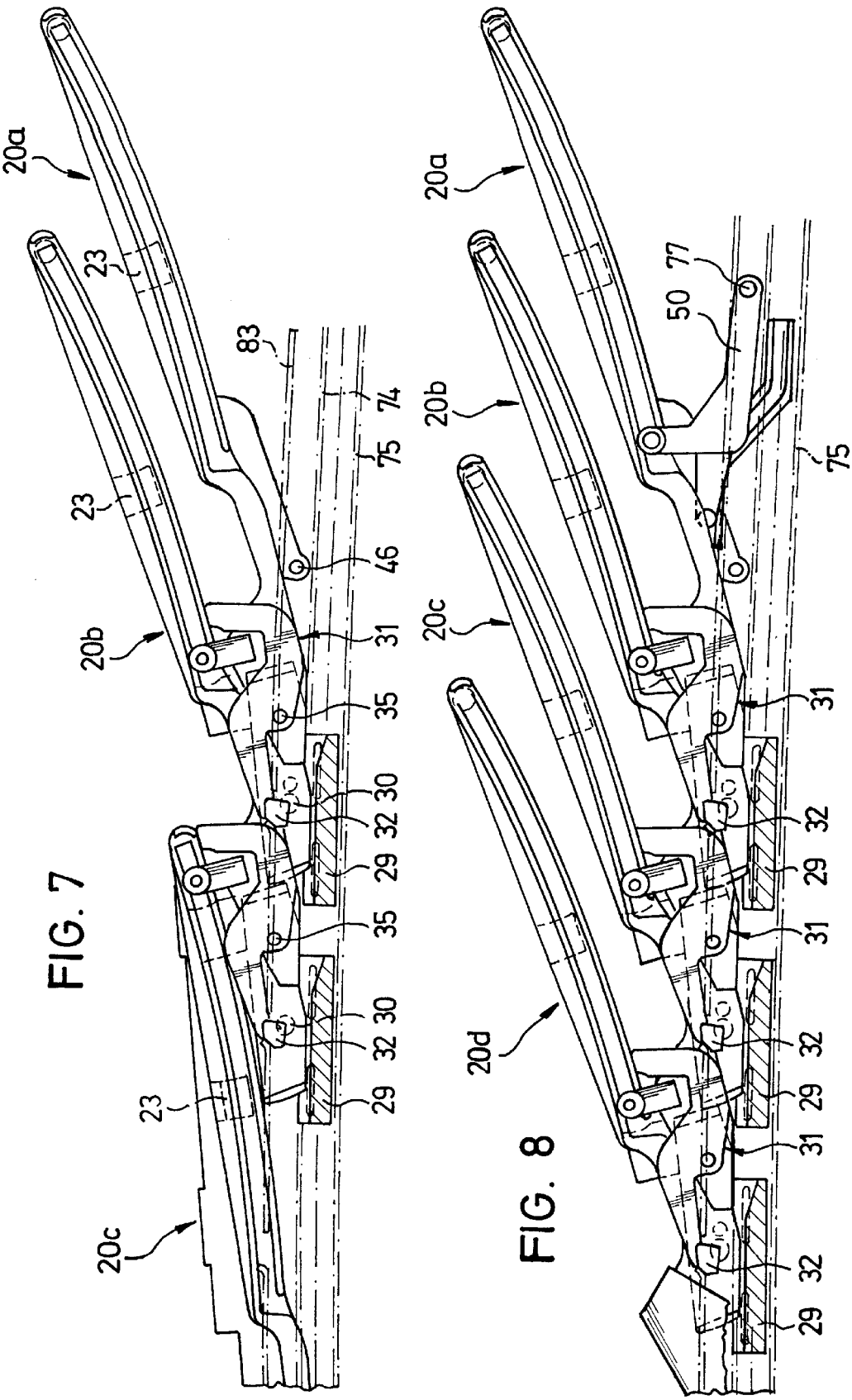

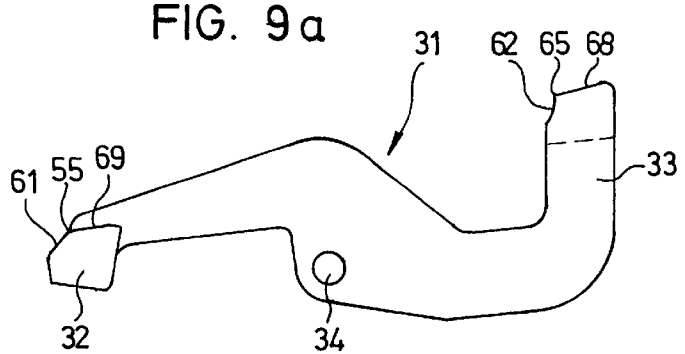
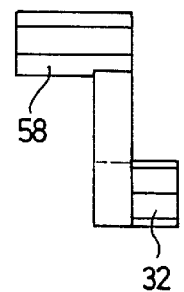
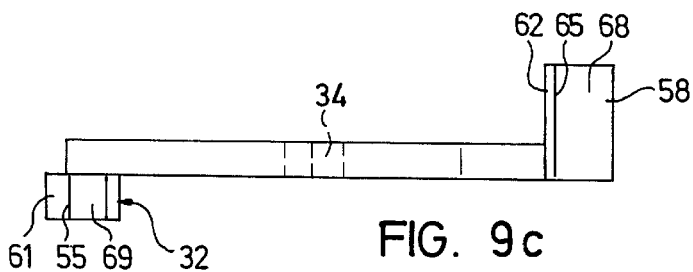
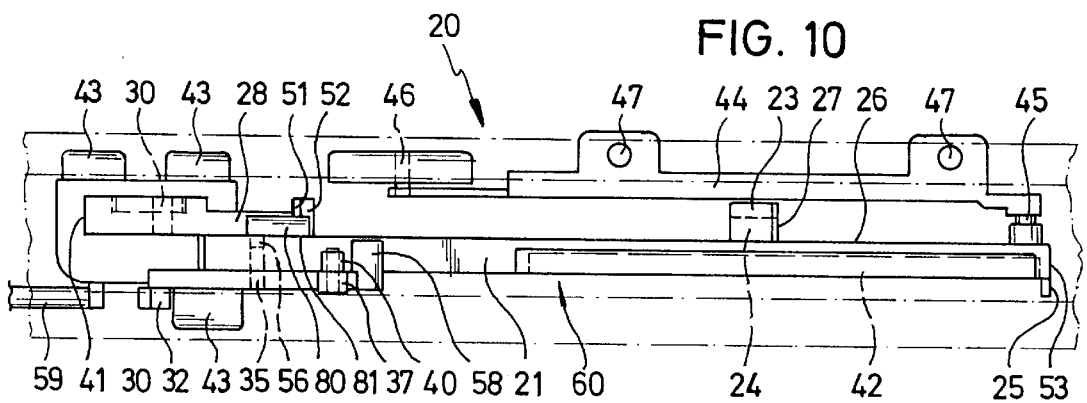

MOTOR VEHICLE ROOF WITH A SERIES OF RAISABLE COVER ELEMENTS

BACKGROUND OF THE INVENTION

1. Field of the Invention

The invention is directed to a vehicle roof of the type with a series of plates for selectively closing and at least partially opening a roof opening in a fixed roof surface, the plates, in a closed position, bordering one another and forming a continuous panel of plates, each plate being slidably guided along a path of movement in a guide device that is connected with the fixed roof surface, on each lateral side of the roof opening, on a pair of guide elements which are spaced one forward of the other in a sliding direction, so that, when the plates are displaced along the guide device in an opening direction, the plates of the continuous panel of plates perform translational and pivoting movements during which the panel of plates is separated into individual plates in a plate-by-plate manner commencing with a rearmost plate of the plate system, the panel of plates being reestablished in a plate-by-plate manner commencing with a forwardmost plate when the plates are displaced along the guide device in a closing direction. In particular, the invention is directed to a vehicle roof of this type in which, in the decoupled state, the pivoted out plates can be moved against one another as each plate is fully swung-out, each fully swung-out plate being locked via an lock element securely to a guideway attached to the roof, and the locking of the fully swung-out plate to the guideway being automatically released under the influence of the closing motion of an adjacent attachment element.

2. Description of Related Art

A vehicle roof of the initially mentioned type is known from U.S. Pat. No. 5,484,185. This vehicle roof is a louvered, roof, and in contrast to sliding or sliding-lifting roofs, enables clearing of relatively large roof openings with simultaneous high stability, secure holding of the louvers, and an aerodynamically favorable behavior. Matching of the roof to different vehicle types can be achieved with relative ease. In the louvered roof known this patent, the lock for a fully swung-out louver is formed by an arrangement with a latch block in a bearing unit which joins two adjacent attachment elements at a time. Under the influence of the motion of the attachment element which is approaching the attachment element of the, current, last fully swung-out louver, a latch block slide, via sloped surfaces, exerts a transverse force on the latch block of the bearing unit which connects these two attachment elements perpendicularly to the opening direction of the vehicle roof so that the latch block is pushed perpendicularly to the opening direction into a latch block receiver in a guide rail attached to the roof, by which it causes locking of the bearing unit on the roof and thus of the fully swung-out louver. When the roof is closed, the reverse motion of the attachment element for the louver, preceding the, current, last fully swung-out louver, via sloped surfaces on the latch block and the latch block receiver, exerts a transverse force on the latch block such that the latch block moves out of the latch block receiver attached to the roof back into the latch block receiver in the latch block slide, and unlocking of the bearing unit (and thus the fully swung-out louver) from the roof.

In this known locking mechanism for a louvered roof, it has been found to be disadvantageous that installation is relatively expensive and the type of locking mechanisms, in practice, requires precise execution of the involved parts, especially the slide and the latch blocks, so that the respective bearing surfaces are made correspondingly small for transmission of force. As a results reliable operation of this known interlock mechanism is not always adequately ensured in practice, especially in series production In particular, the danger exists that the latch blocks will jam.

SUMMARY OF THE INVENTION

A primary object of this invention is to devise a louvered roof which enables simple and cost favorable installation and has an automatically releasable interlock mechanism which ensures reliable and secure opening and closing of the louvered roof at any time.

In conjunction with the foregoing object, it is another object of this invention to provide for secure locking of the roof louvers even in the case of an accident These objects are achieved in a vehicle roof of the initially mentioned type in which the lock element can be swung relative to the attachment element. By providing the lock elements with pivot bearings, much higher reliability of the locking and unlocking motion can be achieved, and especially, the danger of jamming is reduced as compared to sliding motions, as is resistance to movement Most of all, sliding of the lock element transversely to the opening and closing directions is unnecessary. The bearing surfaces can be easily made large enough. Furthermore, the amount of force expended to actuate the lock mechanism can be reduced.

Preferably, the lock element assigned to each attachment element is actuated one at a time by one of the two adjacent attachment elements. The associated saving of parts, on the one hand, entails a general cost advantages and on the other hands facilitates installation. Furthermore, direct actuation of the lock element reduces the probability of operating errors occurring and moreover, facilitates control of operation. In additions a lock mechanism which is simplified in this way allows greater flexibility in the execution of the parts in particulars the parts can be made larger. Overall, the reliability of the locking mechanism is greatly increased.

In another preferred embodiment of the invention, the lock element is made as a latch rocker which is pivotally mounted in its middle sections has a latch part on one end section and has an actuation arm on another end section. This allows suitable force conversion by means of the lever principle.

Preferably, the latch part of the latch rocker is so near the pivot axis of the attachment element with respect to the guide rail that swinging out of the attachment element does not cause a significant vertical motion of the latch part with respect to the guide rail. This allows the lock mechanism to be made simple Furthermore, it is preferred that adjacent attachment elements are joined displaceably relative to one another and are guided laterally by the shoe of a rear attachment element fitting into a crank slot of a front attachment element from one side, while there is an arm on a rear attachment element which acts as an opposite bearing surface. This design ensures stable connection of adjacent attachment elements transversely to the direction of opening.

These and further objects, features and advantages of the present invention will become apparent from the following description when taken in connection with the accompanying drawings which, for purposes of illustration only, show several embodiments in accordance with the present invention.

BRIEF DESCRIPTION OF THE DRAWINGS

FIG. 3 is a schematic perspective view of the side (left side viewed in a direction of forard travel) of two plate carriers of a louvered roof corresponding toFIG. 2 in the opened state;

FIGS. 4a and 4b (viewed together) and FIGS. 5, 6, and 7 are each a side view (left side viewed in the direction of forward travel) of a louvered roof depicting plate carriers in different stages of being opened;

FIG. 8 shows the plate carriers of the combined FIGS. 4a & 4b in their completely opened state;

FIG. 9a through 9c are, respectively, side, top and end views of a latch rocker according to the invention; and FIG. 10 is a plan view of a plate attachment element according to the invention which is on the left viewed in the direction of forward travel

DETAILED DESCRIPTION OF THE PREFERRED EMBODIMENTS

Below, the directions "front" or "preceding" mean in a direction away from the louver plate which is fully swung-out first, "rear" or "following" means in a direction toward the louver plate which is fully swung-out first "inside" means transversely relative to the directions of travel toward the center of the roof opening, "outside" means transversely relative to the directions of travel away from the center of the roof opening, "top" means away from the bottom of the vehicle "bottom" means towards the vehicle bottom. In the illustrated embodiment, in particular, "front" or "preceding" means in a normal forward direction of travel, "rear" or "following" means away from the normal forward direction of travel.

The term "plate" or "louver" is not intended to be limiting in terms of geometrical shape, especially with respect to the ratio of length to width, it being possible for them to also be cover elements which, for example, are as long as they are wide.

Figure 1:
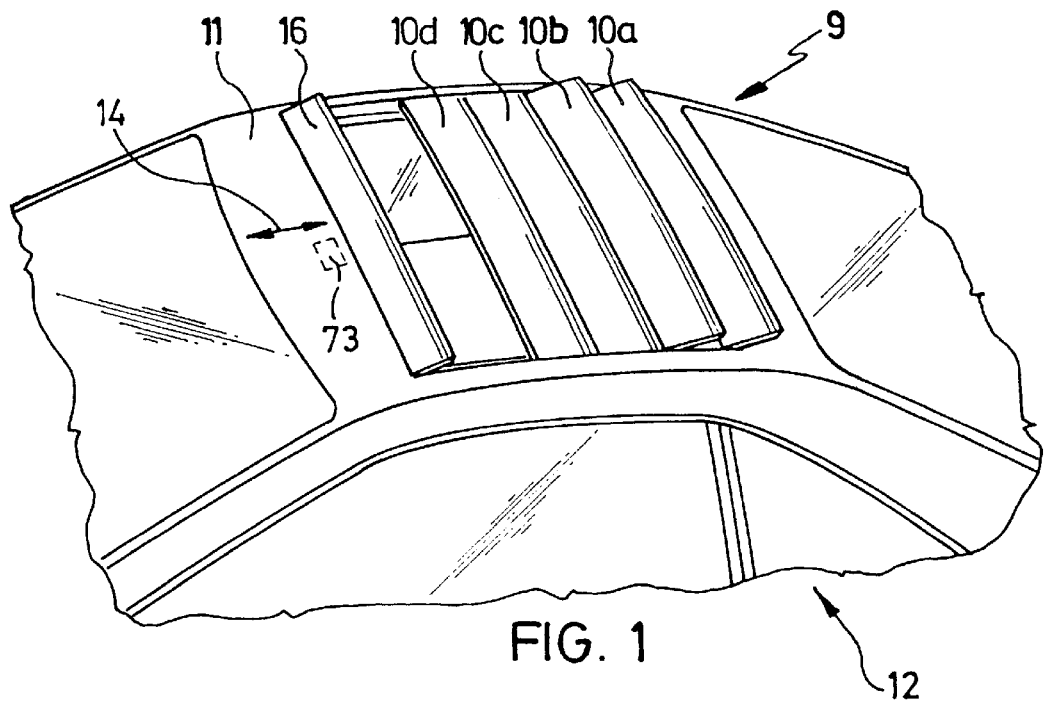
FIG. 1 shows a schematic perspective view of a louvered roof in a partially opened state.
Figure 2:
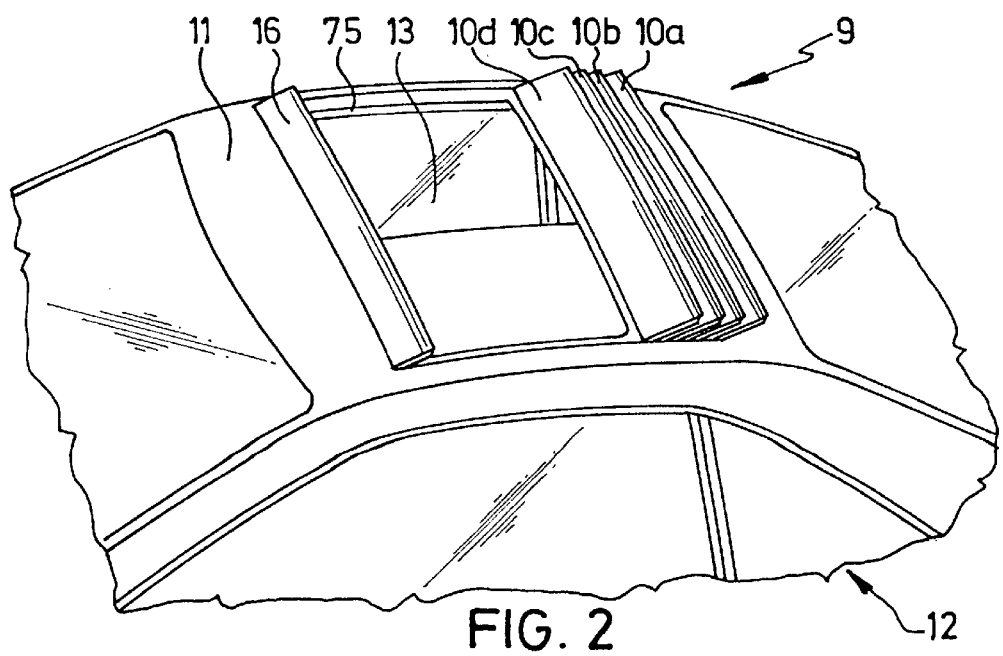
FIG. 2 shows a view corresponding to FIG. 1 with the roof fully opened.

Vehicle roof 9, which can be called a louvered roof, and which is explained here, has a series of sliding cover plates 10a through 10d as can be seen in FIGS. 1 and 2. These plates are used for selective closing or at least partially exposing a roof opening 13 in fixed roof surface 11 of motor vehicle 12. To open and close roof 9, the plates 10a to 10d are displaceable, in the embodiment shown, in the directions of the double arrow 14, i.e., running parallel to the longitudinal axis of the vehicle. However, fundamentally, other displacement directions, for examples transversely to the longitudinal axis of the vehicle, are possible.

In their closed position, plates 10a through 10dtightly abut one another along their longitudinal edges, which run transversely to displacement directions 14, or their sealing elements located there. In doing so, the plates form a flat integrated system of plates, as is shown in FIG. 1 for the frontmost two louver plates 10d and 10c. Plates 10a through 10d can, furthermore, each be swung around a virtual swivel axis which extends transversely relative to displacement directions 14, and which lies roughly at the height of the fixed roof surface 11 in the illustrated embodiment.

An adjustment mechanism explained in detail below coordinates the sliding displacement and pivoting motions of the individual louver plates 10a through 10d such that, when the louvers are displaced, the flat integrated system of plates executes translational displacement in directions 14, and this integrated system is separated, one at a time into individual louvers when roof 9 is opened in the area of the front and/or rear end of the integrated system, and is re-established when the roof is closed. In the course of opening of roof 9 from its closed position, first of all, plate 10a is swung up at its rear edge such that it disengages from the rear edge of roof opening 13. Then, a rearward displacement force can be exerted to the integrated system of plates.

In particular, plate 10a can, then, be shifted to the rear, in an upwardly inclined position, together with the other plates 10b through 10d which remain in the flat integrated system of plates, i.e., which are not swung-out. In doing so, plate 10a continues to swing upward as it moves into its end position. After plate 10a has reached its rear end position shown in FIGS. 1 and 2, the next plate 10b is raised. This procedure repeats itself until, as shown in FIG. 2, all of sliding plates 10a through 10c are raised and pushed back into their fully open position When roof 9 is closed, proceeding from the open position shown in FIG. 2, first of all, only plate 10d is moved forward and swung back into a position parallel to fixed roof surface 11. A corresponding movement is induced in secession for following plates 10c, 10b and 10a until the plates come together, flat in their front end position closing roof opening 13.

In the case of the illustrated embodiment, in the area of the front end of roof opening 13, a plate-shaped wind deflector 16 is located which is swung into a position which rises obliquely to the rear around a pivot axis which runs transversely to the longitudinal axis of the vehicle when the opening process is initiated. In doing so, the roof assumes a ventilation position which can be used even in the rain when the plates are in the closed position. In the closed position of roof 9, the rear edge of wind deflector 16 tightly abuts the front edge of sliding plate 10d. In doing so, the wind deflector 16 closes the frontmost part of the roof opening 13 Optionally, the design can also be such that the flat integrated system of plates 10a through 10d in the closed position, extends from the front edge to the rear edge of roof opening 13, and thus, alone assumes the closing function In such a case, optionally, in a manner conventional for sliding roofs, a wind deflector can be provided which, with the roof closed, disappears below the fixed roof surface and which automatically rises into the working position when the roof is opened.

FIGS. 1 and 2 show a vehicle roof with four sliding plates 10a through 10d. However, it goes without saying that any number of sliding plates can be providing depending on the circumstances. For examples the entire roof opening 13 can be covered by only two plates or cover elements.

Each of the plates 10a through 10d is joined on its two narrow sides to a respective attachment element 20a through 20d. Each of the attachment elements 20a–20d is composed of a displacement element 60 which lies outside and a plate carrier element 44 which lies inside (see especially FIG. 10). Displacement elements 60 each have a rear part 21 and a front part 28. On the rear end 53 of the rear part 21 is a curved bearing surface 25 which faces rearward and which has a bottom edge 64 (FIG. 4b). The bottom 22 of the rear part 21 is formed by a surface which is slightly curved in displacement directions 14. In the rear area of the outside of rear part 21 of displacement element 60 is a curved crank slot 42 which is formed with a curvature which runs roughly parallel to the curvature of bottom 22, and with a front end 49 and a rear end 48 (FIGS. 3 and 4a, 4b). The inside of rear part 21 is labelled 26 (FIGS. 3 and 10).

Displacement element 60 and carrier element 44 are provided with attachment openings 47 for attaching a respective one of the plates 10a–10d are pivotally connected to one another via a pivot pin 45. Pivot pin 45 is located near the rear end 53 of displacement element 60 and it defines a pivot axis oriented transversely to displacement directions 14. The front section of support element 44 has a guide pin 46 which fits into guideway 74 of a guide rail 75 which runs parallel to displacement directions 14 and which is attached to the roof, pin 46 being guided to slide along guideway 74. A driver 23 is formed roughly in the center of rear part 21 of of the inner side of displacement element 60. Driver 23 has a bearing surface 27 which is bounded by a bottom edge 67 and faces rearward; this bearing surface is curved slightly to the front. Driver 23 also has a downwardly open recess 24.

Farther to the front, on the outer side of displacement element 60 an arm 37 with a hole 38 is formed which extends upward. A pin 39 is inserted into this hole 38 and carries a guide shoe 40 (FIG. 3). Shoe 40 is connected on the inside of arm 37 to pivot around an axis which is oriented transversely to displacement directions 14. A guide shoe 40 of the displacement element 60 of one of the attachment elements 20a–20c engages in the crank slot 42 of a preceding one of the attachment elements 20b–20d, such that it can be moved along crank slot 42.

The front end of front part 28 is formed by an end face 41 whose upper edge is labelled 70. Pivot pin 30 is inserted into hole 87 in the front section of front part 28 and pivotally connects a carriage 29 to the front part 28. Carriage 29 is guided to slide, in the guideways of the guide rail 75 which is attached to the roof, via plastic-coated pegs 43 made on both sides. On the outer edge of the rear section of the front part 28, an arm 80 is formed which extends upward and which has a bearing surface 81 pointing outwardly. The rear part 21 of a preceding displacement element 60 is connected to the following attachment element by engagement of shoe 40 in crank slot 42 and is guided laterally to the inside by the inside surface 26 of the rear part 21 of the displacement element 60 resting against bearing surface 81 of arm 80 and laterally to the outside by resting on shoe 40 or arm 37, so that jamming cannot occur.

The rear end face 51 of the front part 28 is provided with a buffer 52 (FIG. 10) of elastic material, for example, rubber. The front part 28 is laterally displaced relative to rear part 21 of displacement element 60 on the inside thereof. The inside surface of driver 23 is roughly flush with the inside surface of front part 28. Recess 24 on driver 23 is dimensioned such that the arm 80 of a following displacement element 60 can move into it without the danger of jamming.

In the area of the front section of rear part 21, on its outer side, a lock element made as latch rocker 31 is pivotally mounted The rear section of latch rocker 31 is made as actuating arm 33 which points upward and which has an upwardly directed, concavely curved bearing surface 62 (FIG. 9a and 9c) which fits together with bearing surface 25 of the rear part 21 of the preceding displacement element 60. Bearing surface 62 is separated from top bearing surface 68 by edge 65. In its upper section, actuating arm 33 has a projection 58 which points to the inside.

A pivot bearing element 35, for example, a riveted eye, extends through hole 56 in rear part 21, and hole 34 in the middle area of latch rocker 31. Pivot bearing element 35 forms a pivot axis which is oriented transversely to the displacement directions 14 and around which latch rocker 31 can be pivoted with reference to the displacement element 60.

In the front section of latch rocker 31, a latch part 32 which is offset to the outside is formed. Latch part 32 has an oblique bearing surface 61 which faces upward and an upper oblique bearing surface 69 which borders it in the area of edge 55. Latch rocker 31 is prestressed by a spring 36 on swivel bearing element 35 (FIG. 5) such that actuating arm 33 is pressed upward (counterclockwise in the view of FIG. 9a).

On guide rail 75, a cheek 83 with a bottom bearing surface 84 is formed and in the rear area has a series of latch openings 85a–85c which lie apart from one another in displacement directions 14 (FIG. 4b). On each latch opening 85a–d, an upwardly and rearwardly sloped bearing surface 86 is formed.

A guide element 50 (FIG. 8), which has essentially one arm and one shoe in the manner of arm 37 and shoe 40 of the attachment elements 20a–d, is pivotally mounted near the rear end of guide rail 75 around axis 77 which is attached to the roof and which is oriented transversely.

A drive cable 59, which is made preferably as a threaded cable, is drive-connected (FIG. 10) to carriage 29 or the front end of the front part 28 of displacement element 60 of frontmost plate 10d. The drive cable 59 extends to a drive unit 73 which is only diagrammatically depicted in FIG. 1. Drive unit 73, in the conventional manner, can have an electric motor and step-down gear, a pinion gear which is joined to the output of the step-down gear engaging drive cable 59 and a corresponding drive cable for the other side of the roof. But, a hand-activated unit, especially in the form of a hand crank, can also be provided as the drive unit.

The described louvered roof operates as follows:

In the closed position of the roof, adjacent plates 10a–d or attachment elements 20a–d are securely coupled to one another. For displacement in an opening direction (i.e., toward the rear), end face 41 of one attachment element (for example 20c) abuts against bearing surface 27 of driver 23 of the preceding attachment element (for example, 20d). Coupling for displacement in the direction of closing (i.e., toward the front) takes place by shoe 40 of one attachment element (for example 20c) engaging against the rear end 48 of crank slot 42 of the preceding attachment element (for example 20d) and/or by two other bearing surfaces engaging each against two adjacent displacement elements 60.

The individual plates are thus protected against unintentional relative movement. Because each of the attachment elements 20a through 20d is guided on its front part 28 via carriage 29 in guide rail 75, and furthermore, the rear end 48 of crank slot 42 engages shoe 40 of they following attachment element or the guide element 50 FIG. 8 attached to the roof, each individual plate is also protected against unintentional pivoting. Latch rockers 31 are each prestressed by springs 36 such that bearing surface 62 of actuating arm 33 rests against bearing surface 25 of the preceding displacement element 60 (FIG. 4a).

Carrier element 44, and thus plates 10, are all parallel to the roof plane with the roof closed. Guide element 50 for last plate 10a, which is attached to the roof, is in a lowered state. Adjacent attachment elements 20 are, as described above, securely guided in the displacement direction, on opposite sides, by rear part 21 resting against shoe 40 or arm 37 and arm 80.

To open the roof, force from drive unit 73 is transferred by drive cables 59 to either side of roof opening 13 in a rearward direction First, the drive motion of drive cable 59, in the manner known from, for examples German Patent 43 29 580 causes wind deflector 16 to be swung-out. At the same time or subsequently, the drive motion of drive cables 59 causes guide element 50 to pivot out around axis 77. This can take place in the manner known, likewise, from German Patent 43 29 580. In this way, the rear edge of the last plate 10a is raised via the seal (not shown) on the rear edge of the roof opening 13 (see FIG. 4b). Subsequently, force is introduced by drive cables 59 on frontmost attachment element 20d. This force is transferred by the driver 23 to the end face 41 of the following one of the attachment elements 20a–c, by which all plates 10a through 10d move rearward together.

The shoe of guide element 50 which is attached to the roof is guided to slide in crank slot 42 of last attachment element 20a. Further shifting of attachment element 20a to the rear relative to the shoe of guide element 50 in addition to shifting causes a further raising motion of last plate 10a.

Instead of swivelling guide element 50, there can fundamentally also be a guide element which is attached to the roof, if the crank slot of the last attachment element is made such that additional raising of the last attachment element can be abandoned. An arrangement of this type is disclosed in co-pending, commonly assigned, U.S. patent application Ser. No. 08/751,682, which is hereby incorporated by reference.

The raising motion of displacement element 60 and carrier element 44 takes place differently, since guide pin 46 or the axis of pivot pin 30 are apart from one another in displacement directions 14. To equalize the different pivot motions, the two elements 44, 60 are pivotally joined to one another via pivot pin 45 on their rear ends, so that rotary motion of displacement element 60 relative to carrier element 44 takes place. Since end face 41 of displacement element 60 is located in front of the axis of pivot pin 30, i.e., the pivot of the raising motion, raising of the rear end of displacement element 60 causes lowering of end face 41 relative to the driver 23 of preceding attachment element 20b. Arm 37, and thus shoe 40, of displacement element 60 is located behind the axis of bearing 30 so that shoe 40, and thus also the rear end of preceding attachment element 20b, are likewise slightly lifted. Corresponding selection of the rotary lever or positions of the pivots (guide pins or bearing axes) ensures that the rear edge of next-to-last plate 10b is raised by pivoting out of following (last) plate 10a above the front edge of last plate 10a, so that the successive plates can slide over one another. The attachment elements 20a through 20d are therefore, coupled such that a pivoting-out motion of last attachment element 20a causes a pivoting-out motion of preceding attachment elements 20b through 20d which continues to the front and lessens dramatically in doing so. By means of the prestress via springs 36, actuating arm 33 tracks each relative motion between adjacent displacement elements 60, so that it always engages against bearing surface 25 of rear part 21. The prestress by springs 36 reliably prevents latch part 32, in the opening motion during passage of latch opening 85, from snapping into the latter, for example, due to vibration.

Latch part 32 is arranged such that it is located at roughly the height of the axis of pivot pin 30, which forms the pivot of the raising motion. In this way, during the increasing raising motion of displacement element 60 as it is opened, the relative height of latch part 32 essentially remains unchanged with respect to the cheek 83 of guide rail 75. However in doing so, a rotary motion of latch part 32 takes place. Upper bearing surface 69 of latch part 32 engages increasingly against the lower bearing surface 84 of cheek 83 of guide rail 75. By means of a corresponding oblique configuration of upper bearing surface 69 of latch part 32, this contact causes a certain rotation of latch rocker 31 (which is clockwise as viewed in FIGS. 4 through 7), i.e., actuating arm 33, and thus bearing surface 62 move upward.

The curvature of bearing surface 27 of driver 23 or end face 41 of front part 28 are selected such that, a starting with a certain pivoted-out position of displacement element 60, latch rocker 31 transfers drive force from the preceding displacement element 69 to the following displacement element 60, via pivot pin 30, by upper bearing surface 69 engaging against bottom 84 of cheek 83. This is advantageous inasmuch as the overlapping of bearing surface 27 of driver 23 with end face 41 becomes less and less as the pivoting out increases, so that the pressure becomes greater and greater; this could lead to damage of corresponding bearing surfaces 27 and 41 and especially to edges 67 and 70 which border these surfaces. The corresponding elements are dimensioned such that the transfer of force passes at the proper time to latch rocker 31 such that this damage can be avoided in any case. In this way, the force-fit between the last two attachment elements 20a, 20b is assumed by the corresponding latch rocker 31 when the upper edge of end face 41 of last attachment element 20a has not yet dropped completely below lower edge 67 of bearing surface 27 of driver 23 of next to last attachment element 20b.

As soon as the edge 55 between bearing surfaces 61 and 69 of the latch part 32 has reached front bearing surface 86 of last latch opening 85a, bearing surface 61 can slide down on bearing surface 86, by which latch part 32 can move up into latch opening 85a; in turn, this allows bearing surface 62 or edge 65 of the latch part to slide down on inclined bearing surface 25 of displacement element 60 In this way, the force-fit between the last two attachment elements 20a and 20b is cancelled. These attachment elements are now decoupled. Next-to-last attachment element 20b can now shift relative to the last one. Thus, a clutch is formed by driver 23 on the front attachment element 20a and a front end face 27 of the following attachment element 20bwhich engage one another when the cover elements are part of the flat integrated system, and disengage when the attachment element 20a has at least substantially reached its fully swung-out position.

The torque acting on latch rocker 31 is the scalar product of component a F of the drive force transmitted to attachment element 20b and the distance vector, component F being oriented tangentially to crank slot 42 of attachment element 20b, between the pivot of latch rocker 31 in swivel bearing element 35 and the force introduction point on edge 65 of actuating arm 33 of latch rocker 31, i.e., the product of F times X in FIG. 6. Therefore, the force acting on latch part 32 is determined by the corresponding distances of actuating arm 33 and latch part 32 from swivel bearing element 35.

Latch part 32 is kept engaged to last latch opening 85a held by upper bearing surface 68 of actuating arm 33 engaging against bottom 22 of rear part 21 of displacement element 60, and in this way, causes locking of the last attachment element 20a on the roof. Last plate 10a is thus protected against movement forward and backwards.

The continuing opening process takes place analogously as already described, now, instead of last attachment element 20a, next-to-last attachment element 20b being swung-out by shifting against shoe 40 of last attachment element 20a. The function of guide element 50 attached to the roof is consequently assumed by the shoe 40 or front part 28 of last attachment element 20a which is now locked securely on the roof. When next-to-last attachment element 20b is fully swung-out the buffer 52 on the rear end face 51 of the next-to-last attachment element 20b comes to rest against the front end face 41 of the last attachment element 20a.

Decoupling of the force of two attachment elements (for example 20b, c) in the opening motion causes the preceding attachment element (20c) to lock the following attachment element (20b) securely to the roof by pressing the actuating, arm 33 down into latch block opening 85b.

The opening process can now be continued analogously until the frontmost attachment element 20d is fully swung-out and roof opening 13 is thus maximally exposed. With the exception of frontmost plate 10d, all plates are then locked securely to the roof in the fully swung-out position. Frontmost plate 10d is locked in its position by the drive due to the drive cables 59 being rigid and self-locking in the conventional manner.

If, now, a closing motion is initiated, force is transferred from drive units 73 to the drive cables 59 which engage first plate 10d on either side of the roof opening 13 in a forward direction. Unlocked first plate 10d moves, in this way, to the front. Shoe 40 of second attachment element 20c, in doing so, slides in crank slot 42 of first attachment element 20d. First attachment element 20d is partially swung back again to the front by the closing motion. Movement of second attachment element 20c cannot take place in the closing direction, since its latch part 32 is kept engaged to latch opening 85c via contact of actuating arm 33 of the latch rocker against bottom 22 of first attachment element 20d.

As soon as edge 65 of actuating arm 33 has reached the rear end of the bottom 22 of rear part 21 of attachment element 20d, actuating arm 33 can move upward so that sliding off of bearing surface 61 of latch part 32 on the bearing surface 86 of latch opening 85c becomes possible. Force is introduced into attachment element 20c, as mentioned above by the shoe 40 of the attachment element 20c engaging against the rear end 48 of the crank slot 42 of the preceding attachment element 20d, or by the other two bearing surfaces engaging against two adjacent displacement elements 60 at a time. Latch part 32 thus moves out of latch opening 85c, by which locking of attachment element 20c on the roof is canceled. Adjacent attachment elements 20d and 20c are now coupled to one another for the closing motion. Furthermore, second attachment element 20c is moved to the front, at the same time, by first attachment element 20d. First, two attachment elements 20c and 20d are coupled in the direction of opening via latch rocker 31 of second attachment element 20c, later via bearing surface 27 of the driver 23 of the first attachment element 20d and end face 41 of the second attachment element 20c. This coupling in the direction of opening would take effect, for example, when the drive direction is reversed.

The subsequent closing process takes place for the other attachment elements or plates in a similar manner; ultimately, by the closing motion of the next-to-last attachment element 20b, locking of last attachment element 20a on the roof in latch opening 85a is released. When the shoe of guide element 50 is attached to the roof, the shoe which engages last attachment element 20a, reaches rear end 48 of crank slot 42, guide element 50 is swung back again and all plates are again in one plane parallel to the roof plane. The closing process therefore takes place such that some of the plates are coupled to one another and move together in the direction of closings while the other plates are locked securely on the roof and cannot take part in the closing motion. The last movable and the first locked plates are each decoupled from one another. To keep mechanical play low, coupling of the first locked plate to the last movable plate takes place very shortly after unlocking of first locked plate, i.e., almost at the same time.

In the described embodiment, all attachment elements 20 (possibly with the exception of the first and/or the last) and all latch rockers 31 are made identical. The latch rockers are each attached in the same way to the respective attachment element. The attachment elements are located in the longitudinal direction in one plane. The swivelling motions of all latch rockers are consequently in the same plane, which is perpendicular to the roof surface and which contains the opening and closing direction. All attachment elements and latch blocks are at the same height relative to the guide rail attached to the roof.

Embodiments according to the invention are not limited to the fact that the latch rockers, as described above, can be swung around an axis which is roughly parallel to the roof surface and perpendicular to the shift direction. Operation according to the invention can be accomplished, for example, also by pivoting of the latch rockers around axes perpendicular to the roof surface.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Motor vehicle roof with a series of cover elements for selectively closing and at least partially exposing a roof opening in a fixed roof surface; wherein the cover elements border one another and form a flat integrated system in a closed position of the roof; wherein narrow sides of each cover element are joined to a respective pivotable attachment element which has a pivot mounting; wherein each of the attachment elements is guided along a guideway which is attached to the roof; wherein each of the attachment elements is coupled to an adjacent attachment element by a disengageable coupling for joint movement in opening and closing directions and being decoupled by disengagement of said coupling, one by one, as soon as each of the adjacent attachment elements reaches a fully swung-out position; wherein said attachment elements are movable relative to one another when decoupled as each of the adjacent attachment elements is successively swung-out via said pivot mounting; wherein a respective locking element is provided for automatically fixing each attachment element securely with respect to the guideway when the fully swung-out position thereof is reached and for automatically releasing the respective attachment element due to movement of an adjacent attachment element in a closing direction; and wherein said locking element is mounted in a manner enabling it to swing relative to the attachment element.

2. Vehicle roof according to claim 1, wherein the lock element is constructed so as to produce a force fit between unlocked adjacent attachment elements at least during a certain phase of the motion of the cover elements.

3. Vehicle roof according to claim 2, wherein the lock element of a rear one of two adjacent attachment elements forms the force fit during the opening motion from a position during a phase from before decoupling with the adjacent attachment element until decoupling.

4. Vehicle roof according to claim 1, wherein the lock element is a latch rocker which is pivotally mounted in a center section thereof: wherein a first end section of the latch rocker has a latch part; and a second end section of the latch rocker has an actuating arm.

5. Vehicle roof according to claim 4, wherein the first end section lies in forward of the second end section in the direction of closing movement.

6. Vehicle roof according to claim 4, wherein the first end section is guided to slide vertically.

7. Vehicle roof according to claim 5, wherein the latch rocker is prestressed by a spring in a direction pressing the actuating arm of the latch rocker upward.

8. Vehicle roof according to claim 7, wherein the actuating arm of the latch rocker of one attachment element has a front bearing surface which due to said prestress engages against a rear bearing surface of a preceding attachment element until the preceding attachment element is almost completely swung-out.

9. Vehicle roof according to claim 8, wherein the guideway is formed on each side of the roof by a guide rail which has latch openings for locking of the attachment elements on the roof.

10. Vehicle roof according to claim 9, wherein an upper bearing surface is formed on the latch part; wherein sections of the guide rail between latch openings form a stop for the upper bearing surface, such that the rear bearing surface of one attachment element cannot completely disengage from the front bearing surface of the actuating arm of the latch rocker of the following attachment element, so that the front and rear bearing surfaces can provide a force-fit between adjacent attachment elements during movement of the adjacent attachment elements in the opening direction.

11. Vehicle roof according to claim 9, wherein, when adjacent attachment elements are decoupled, the latch rocker of the following attachment element is swung clockwise off of the rear bearing surface of the preceding attachment element and the front bearing surface thereof causes engagement of a latch part of the latch rocker in a corresponding latch opening of the guide rail.

12. Vehicle roof according to claim 11, wherein for decoupled adjacent attachment elements, the latch part of the latch rocker of the following attachment element is kept engaged in the respective latch opening by engagement of a top bearing surface on the actuating arm with a bottom of the preceding attachment element.

13. Vehicle roof according to claim 12, wherein the attachment element is connected to the guide rail by pivoting connection; and wherein the latch part of the latch rocker is positioned near enough to the pivoting connection of attachment element to the guide rail that pivoting out of the attachment element produces a minimal vertical motion of the latch part with respect to the guide rail.

14. Vehicle roof according to claim 11, wherein the latch part has a front bearing surface which abuts a facing surface of the latch opening when the latch part engages in the latch opening.

15. Vehicle roof according to claim 14, wherein the front bearing surface of the latch part is forwardly sloped to the front for enabling the bearing surface to slide off said facing surface of the latch opening to release the respective attachment element from the roof.

16. Vehicle roof according to claim 1, wherein, for two adjacent, fully swung-out attachment elements, a back end face formed on a preceding attachment element by a buffer element of elastic material abuts a front end face formed on the following attachment element.

17. Vehicle roof according to claim 1, wherein a front section of each attachment element is pivotally connected to a carriage which is guided to slide along the guideway.

18. Vehicle roof according to claim 1, wherein adjacent attachment elements are displaceably joined to one another in a vertically guided manner by a shoe formed on one of the adjacent attachment elements fitting into a crank slot which is formed in a side of a preceding one of the adjacent attachment elements.

19. Vehicle roof according to claim 18, wherein adjacent attachment elements are displaceably joined to one another in a laterally guided manner by a shoe of a rear one of the adjacent attachment elements laterally fitting into the crank slot of a front one of the adjacent attachment elements, while an arm which is formed on the rear one of the adjacent attachment elements is provided as an opposite bearing surface.

20. Vehicle roof according to claim 19, wherein adjacent attachment elements are joined for motion in the opening direction of movement by a clutch which can be engaged and released depending on relative pivoting of one to the other; and wherein the clutch is formed by a driver on the front attachment element and a front end face of the rear attachment element which engage one another when the cover elements are part of the flat integrated system, and disengage when one of the attachment elements has at least substantially in its fully swung-out position.

21. Vehicle roof according to claim 20, wherein the driver has a recess into which the arm of the adjacent attachment element is movable.

22. Vehicle roof according to claim 1, wherein the locking element of a respective attachment element is positioned so as to be directly actuatable by engagement with one of two adjacent attachment elements.

23. Vehicle roof according to claim 1, wherein the cover elements are plates.

24. Vehicle roof according to claim 6, wherein the latch rocker is prestressed in a direction pressing the actuating arm of the latch rocker upward.

25. Vehicle roof according to claim 10, wherein, when adjacent elements are decoupled, the latch rocker of the following attachment element is swung clockwise off of the rear bearing surface of the preceding attachment element and the front bearing surface thereof engages in a corresponding latch opening of the guide rail.

\* \* \* \* \*